US006527092B2

(12) United States Patent
Gruber et al.

(10) Patent No.: US 6,527,092 B2
(45) Date of Patent: Mar. 4, 2003

(54) METHOD FOR PRODUCING BRAKE DISCS FORMED OF CERAMIC PARTS WITH METAL HUBS AND BRAKE DISC PRODUCED ACCORDING TO THE METHOD

(75) Inventors: Udo Gruber, Neusäss (DE); Michael Heine, Allmannshofen (DE); Andreas Kienzle, Thierhaupten (DE)

(73) Assignee: SGL Carbon AG, Meitingen (DE)

( * ) Notice: Subject to any disclaimer, the term of this patent is extended or adjusted under 35 U.S.C. 154(b) by 0 days.

(21) Appl. No.: 09/793,341

(22) Filed: Feb. 26, 2001

(65) Prior Publication Data
US 2001/0025751 A1 Oct. 4, 2001

Related U.S. Application Data

(63) Continuation of application No. PCT/EP00/05548, filed on Jun. 16, 2000.

(30) Foreign Application Priority Data

Jun. 25, 1999 (DE) .......................... 199 29 358

(51) Int. Cl.$^7$ ............................... F16D 65/10
(52) U.S. Cl. ..................... 188/218 XL; 188/251 A; 428/408; 501/88
(58) Field of Search ................ 188/218 XL, 18 A, 188/71.5, 73.2, 251 A, 251 R, 251 M, 218 R, 264 A, 255–258; 192/107 M, 109 B; 428/408, 218; 501/88, 90, 95.2, 96.2

(56) References Cited

U.S. PATENT DOCUMENTS

| 5,503,214 A | * | 4/1996 | Cribley et al. .............. 164/134 |
| 5,620,791 A | | 4/1997 | Dwivedi et al. ............. 428/323 |
| 5,878,843 A | * | 3/1999 | Saum ..................... 188/218 XL |
| 6,261,981 B1 | * | 7/2001 | Dietrich et al. ............. 501/95.2 |
| 6,265,071 B1 | * | 7/2001 | Gross et al. ................ 428/408 |

OTHER PUBLICATIONS

International Publication WO 97/22815 (Hubbard et al.), dated Jun. 26, 1997.
International Publication WO 97/38235 (Atmur et al.), dated Oct. 16, 1997.
International Publication WO 98/09092 (Atmur et al.), date Mar. 5, 1998.

* cited by examiner

Primary Examiner—Pam Rodriguez
(74) Attorney, Agent, or Firm—Laurence A. Greenberg; Werner H. Stemer; Ralph E. Locher

(57) ABSTRACT

A method for the production of brake discs having friction areas made of ceramic materials, in particular composite materials, includes placing at least one ceramic portion in a diecasting mold and joining the ceramic portion with molten metals by casting under pressure into a rotationally symmetrical body which contains at least one ceramic (composite) segment that is disposed symmetrically relative to the axis of rotation of the metal body and juts out over at least one surface of the metal body perpendicular to the axis. A brake disc produced according to the method is also provided.

19 Claims, No Drawings

METHOD FOR PRODUCING BRAKE DISCS FORMED OF CERAMIC PARTS WITH METAL HUBS AND BRAKE DISC PRODUCED ACCORDING TO THE METHOD

CROSS-REFERENCE TO RELATED APPLICATION

This application is a continuation of copending International Application No. PCT/EP00/05548, filed Jun. 16, 2000, which designated the United States.

BACKGROUND OF THE INVENTION

FIELD OF THE INVENTION

The invention relates to a method for producing brake discs formed of ceramic parts with metal hubs. The invention also relates to a brake disc produced according to the method.

Today, the following requirements are made of heavy-duty brakes: they must convert large (kinetic) energies into thermal energy in a short time, even immediately after braking (that is mostly in a hot state) they must not substantially lose efficiency, and the frictional connection with a vehicle axle must withstand large torques during deceleration.

At the same time, there is a requirement to make a brake unit as light as possible in order to keep a moment of inertia of a driving axle or decelerating axle as small as possible. It is also sought to select a material pairing for brake discs and brake blocks in such a way that the brake blocks, which are easier to replace, show greater wear within the pairing.

Most heavy-duty brakes are realized today in the type of disc brake in which the brake disc is formed mostly of steel or cast iron. In brakes in which operating temperatures of approximately 250 to approximately 600° C. occur (for example Formula I racing cars or aircraft) brake discs made of carbon fiber reinforced carbon have already been used successfully. That material, however, is oxidized at the surface at higher temperatures and therefore has unfavorable properties with long-term use. As is well known, a ceramic composite material having a silicon carbide matrix reinforced with a netting of carbon fibers behaves more favorably (International Publication No. WO97/22815). The great dimensional stability and stiffness of the carbon fibers is thus combined with the favorable wear properties of silicon carbide, in particular, with its excellent oxidation stability and thermal characteristics as well. That publication discloses that segments of that ceramic composite material are ground to a required shape and then fixed on a steel support between a hub and spokes.

The machining of ceramics, in particular ceramic composite materials, is expensive and can only be automated with difficulty for large scale manufacture.

SUMMARY OF THE INVENTION

It is accordingly an object of the invention to provide a method for producing brake discs formed of ceramic parts with metal hubs and a brake disc produced according to the method, which overcome the hereinafore-mentioned disadvantages of the heretofore-known products and methods of this general type and which permit a series production of brake discs having ceramic portions, in particular ceramic composite materials, as friction areas.

With the foregoing and other objects in view there is provided, in accordance with the invention, a method for the production of brake discs having friction areas made of ceramic materials, in particular composite materials, which comprises placing at least one ceramic portion in a diecasting mold; and joining the at least one ceramic portion with molten metals by casting under pressure into a rotationally symmetrical metal body containing at least one ceramic (composite) segment disposed symmetrically relative to an axis of rotation of the metal body and jutting out over at least one surface of the metal body perpendicular to the axis.

The location of the ceramic elements in the mold is thereby to be selected in such a way that the axis (of symmetry) of the mold and a zone around this axis with a radius which preferably amounts to at least $\frac{1}{10}$ and at most $\frac{2}{3}$ of the radius of the finished brake disc, is free of ceramic portions. It is essential for the dimensioning of this zone around the axis that the torque caused by the braking deceleration can be conveyed to the axis of rotation. Preferably, the central portion (close to the axis of symmetry), that is the hub, is realized in the shape of a pot. The ceramic portions can have any cross-section, and the number of them amounts to at least one, preferably 2 to 80, and in particular 4 to 40. The portions must be disposed symmetrically with respect to the axis of rotation, at which portions of different size or different shape can be used likewise at the same time, as long as each portion together with at least one other portion fulfills the symmetry condition or is itself rotationally symmetrical. However, it is preferred that all ceramic portions have the same size. The cross-sections of the ceramic portions can be circular, elliptical or wedge-shaped. However, rectangular or trapezoidal cross-sections can also be used.

In principle, all ceramic materials which are known, can be used as the ceramic materials. However, because of the temperature load, those materials which are not degraded by oxidation at the high temperatures which occur during the braking, and which still have an adequate hardness even at these temperatures, are preferred. Such materials are, in particular, fiber-reinforced ceramics, preferably ceramics which are reinforced with carbon fibers or metal whiskers. Silicon carbide and other non-oxidic ceramics, such as silicon nitride, are particularly preferred because of their favorable thermal characteristics, their great hardness and because of their chemical resistance. The various silicon carbide ceramics, such as RSiC (recrystallized silicon carbide), SSiC (sintered SiC) and SiSiC (silicon-infiltrated silicon carbide) are outstandingly suitable, in particular carbon-fiber-reinforced SiC (C/SiC).

The metal which is used as the support and force-transmitting portion must melt at a temperature which is below the decomposition temperature of the ceramic, it must have a sufficient stiffness in torsion to lead the required force into the brake disc even at an elevated temperature, its thermal expansion should not differ too much from that of the ceramic, and it must not (chemically) attack the ceramic. In combination with a ceramic of carbon-fiber-reinforced silicon-infiltrated silicon carbide, for example, aluminum is suitable, as are aluminum alloys with mass portions of at least 40% aluminum in the alloy.

The production of the brake discs takes place in such a way that ceramic segments are put in place symmetrically into a diecasting mold with the aid of suitable automatic placement devices. The molten metal is then injected into this mold at a pressure of approximately 5 to approximately 500 bar. It is therefore advantageous to preheat the diecasting mold. After solidification of the metal, the mold is opened as usual, the part is taken out and the mold is loaded once again with the ceramic inserts, after which the injection procedure can be carried out once again. The cooled-down part can then be remachined in so far as this is necessary.

If only one ceramic portion is used, it is rotationally symmetrical, preferably annular. Preferably, the annulus has individual elements at the side close to the axis, preferably at least two such elements. The elements are protrusions or recesses facing towards the axis of rotation. The frictional connection between ceramic and metal is improved because of these elements. In the context of the invention, it is also possible to couple two or more such ring discs in the abovedescribed diecasting method with a metal portion close to the axis. In the case of this embodiment, it has proven favorable to mold metal elements between the two discs, in addition to the pot-shaped hub already described, which operate in the sense of a propeller or impeller to generate an air current between the two discs, which more quickly carries away heat due to energy losses that arises during braking.

With the objects of the invention in view, there is also provided a brake disc having friction areas made of ceramic materials.

Other features which are considered as characteristic for the invention are set forth in the appended claims.

Although the invention is described herein as embodied in a method for producing brake discs formed of ceramic parts with metal hubs and a brake disc produced according to the method, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

EXAMPLE 1 wedge-shaped C/SiC segments (length=approximately 65 mm, width=approximately 18/approximately 10.6 mm, height=32 mm) were placed by hand into a diecasting mold. Geometrically matching recesses with a depth of 10 mm were provided for these segments in the diecasting mold in such a way that the individual segments formed a segmented circle with an external diameter of 320 mm and an internal diameter of 190 mm. There was a 10 mm wide gap between the individual segments. In a subsequent diecasting process, these gaps were filled with an aluminum alloy (Al—Si12Fe), which led to the fixing of the individual segments into a 12 mm thick Al support structure and thus to the formation of a friction ring with simultaneous joining of this friction ring with a pot of this Al alloy that was likewise formed during the diecasting process. The casting mold was heated to 300° C. in order to carry out the diecasting. Subsequently, the Al alloy, which was preheated to a temperature of 680° C., was injected into the casting mold under a pressure of approximately 50 bar. The friction unit was removed from the mold after solidification of the melt and machined after cooling-down to room temperature. In other words, the friction surface was ground.

EXAMPLE 2

A C/SiC ring segment with an external diameter of 320 mm and an internal diameter of 190 mm was conveyed by hand into a diecasting mold. There were 10 mm long teeth on the ring inside of this ring shape. A joining-on of a pot in a subsequent diecasting took place by way of these teeth. These teeth were thereby enclosed with the melt of the alloy.

The casting mold was heated to 300° C. in order to carry out the diecasting. Subsequently, an Al alloy, which was preheated to a temperature of approximately 680° C., was injected into the casting mold under a pressure of approximately 50 bar. The friction unit was removed from the mold after the solidification of the melt and machined after cooling-down to room temperature. In other words, it was ground at the surface.

We claim:

1. A method for the production of brake discs having friction areas made of ceramic materials, which comprises;

placing at least one ceramic portion in a diecasting mold;

joining the at least one ceramic portion with molten metals by casting under pressure into a rotationally symmetrical metal body containing at least one ceramic segment disposed symmetrically relative to an axis of rotation of the metal body and jutting out over at least one surface of the metal body perpendicular to the axis; and forming a zone around the axis with a radius of at least $\frac{1}{10}$ of the radius of the brake disk free of ceramic portions.

2. The method according to claim 1, wherein the at least one ceramic segment is a composite segment.

3. The method according to claim 1, wherein the at least one ceramic portion is a ceramic ring disc.

4. The method according to claim 3, wherein the ring discs have protrusions facing towards the axis for improving a frictional connection between metal and ceramic.

5. The method according to claim 3, wherein the ring discs have recesses facing away from the axis for improving a frictional connection between metal and ceramic.

6. The method according to claim 1, wherein the at least one ceramic portion is at least two ceramic portions disposed as parallel ring discs.

7. The method according to claim 6, wherein the ring discs have protrusions facing towards the axis for improving a frictional connection between metal and ceramic.

8. The method according to claim 6, wherein the ring discs have recesses facing away from the axis, for improving a frictional connection between metal and ceramic.

9. The method according to claim 6, which further comprises forming metal portions between the two discs causing a propeller effect and creating an air current between the two discs for cooling the discs with internal ventilation.

10. The method according to claim 6, which further comprises forming metal portions between the two discs causing an impeller effect and creating an air current between the two discs for cooling the discs with internal ventilation.

11. The method according to claim 1, which further comprises forming a portion of the metal body close to the axis as a pot-shaped hub.

12. A brake disc having friction areas made of ceramic materials comprising:

at least one ceramic portion; and a metal hub forming a rotationally symmetrical metal body containing at least one ceramic segment disposed symmetrically relative to an axis of rotation of the metal body, and jutting out over at least one surface of the metal body perpendicular to the axis, therein a zone around the axis with a radius of at least $\frac{1}{10}$ of the radius of the brake disk is free of ceramic portions.

13. The brake disc according to claim 12, wherein said at least one ceramic segment is a composite segment.

14. The brake disc according to claim 12, wherein the at least one ceramic portion is a ceramic ring disc.

15. The brake disc according to claim 14, wherein said at least one ceramic portion is a ceramic composite material.

16. The brake disc according to claim 12, wherein the at least one ceramic portion is at least two ceramic portions disposed as parallel ring discs.

17. The brake disc according to claim 16, wherein said at least two ceramic portions are ceramic composite materials.

18. The brake disc according to claim 16, including metal portions disposed between said two discs causing a propeller effect to generate an air current between said two discs for cooling said discs with internal ventilation.

19. The brake disc according to claim 16, including metal portions disposed between said two discs causing an impeller effect to generate an air current between said two discs for cooling said discs with internal ventilation.

* * * * *